United States Patent [19]

Fisli

[11] 4,374,617
[45] Feb. 22, 1983

[54] MULTI-FUNCTION DOCUMENT PROCESSOR

[75] Inventor: Tibor Fisli, Los Altos Hills, Calif.

[73] Assignee: Xerox Corporation, Stamford, Conn.

[21] Appl. No.: 290,136

[22] Filed: Aug. 5, 1981

[51] Int. Cl.³ .............................................. G03G 15/28
[52] U.S. Cl. .......................................... 355/8; 355/11
[58] Field of Search ................... 355/57, 66, 8, 11

[56] References Cited

U.S. PATENT DOCUMENTS

| | | | |
|---|---|---|---|
| 4,205,350 | 5/1980 | Gunning | 355/8 |
| 4,241,990 | 12/1980 | Fisli | 355/11 |
| 4,274,703 | 6/1981 | Fisli | |
| 4,314,154 | 2/1982 | Minoura et al. | 355/8 |
| 4,320,962 | 3/1982 | Takahashi et al. | 355/8 |

*Primary Examiner*—Monroe H. Hayes

[57] ABSTRACT

A rotating polygon-type laser scanning subsystem is integrated with a photocopying subsystem to provide a relatively high quality, economical and compact multi-function document processor. To optimize the performance of the document processor, the laser scanning subsystem preferably is a symmetrical, double pass, underfilled system, and the photocopying system preferably is a light/lens xerographic system. Shared optics are used to reduce the cost, complexity and size of the document processor.

11 Claims, 8 Drawing Figures

MULTI-FUNCTION DOCUMENT PROCESSOR

FIELD OF THE INVENTION

This invention relates to multi-function document processors and, more particularly, to document processors for selectively performing photocopying and one or more laser scanning functions, such as raster input scanning (RIS) and raster output scanning (ROS).

BACKGROUND OF THE INVENTION

Substantial effort and expense have been devoted to the development of multi-function document processors which combine a photocopying capability with various electronic document processing functions, including facsimile transmission and reception, computer printing, and document editing and storage. Light/lens xerography is still the generally preferred technique for conventional photocopying, and laser based raster input and output scanning have gained widespread acceptance for electronic document processing. Accordingly, the basic challenge is to economically and compactly integrate a laser based raster input and/or output scanning subsystem with a xerographic photocopying subsystem. Another challenge is to obtain reliable, high quality performance from the integrated subsystems. As will be appreciated the ultimate aim is to provide a multifunction document processor which not only favorably compares in performance with dedicated, state of the art photocopiers and laser scanners, but which also has distinct cost and size advantages over the equivalent collection of dedicated equipment.

Significant progress has been made toward meeting the foregoing goal. U.S. Pat. No. 4,241,990, which issued Dec. 30, 1980 on an application of Tibor Fisli for a "Multi-Purpose Optical Data Processor", shows that a laser RIS/ROS capability may be built into the Xerox 3100 copier, without materially degrading its light/lens copying performance. Indeed, in accordance with the teachings of that patent, the laser scanning and copying functions are relatively economically integrated by utilizing shared optics for imaging purposes. Unfortunately, however, the holographic laser scanning mechanism proposed by the above patent does not come up to the high standards of optical efficiency, wide scan angle linearity, and scan field flatness that have been established by the symmetrical, double pass, underfilled, rotating polygon laser scanner of U.S. Pat. No. 4,274,703, which issued June 23, 1981 on an application of Tibor Fisli for "High-Efficiency Symmetrical Scanning Optics." Thus, the objective of efficiently combining a state of the art photocopying capability with a state of the art laser scanning capability has not yet been fully realized.

SUMMARY OF THE INVENTION

In accordance with the present invention, a rotating polygon-type laser scanning subsystem is integrated with a photocopying subsystem to provide a relatively high quality, economical and compact multi-function document processor. To optimize the performance of the document processor, the laser scanning subsystem preferably is a symmetrical, double pass, underfilled system, and the photocopying system preferably is a light/lens xerographic system. Shared optics are used to reduce the cost, complexity and size of the document processor.

BRIEF DESCRIPTION OF THE DRAWINGS

Further objects and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, there is no intent to limit it to those embodiments. On the contrary, the aim is to cover all modifications, alternatives and equivalents falling within the spirit and scope of the invention as defined by the appended claims.

Figure 1:
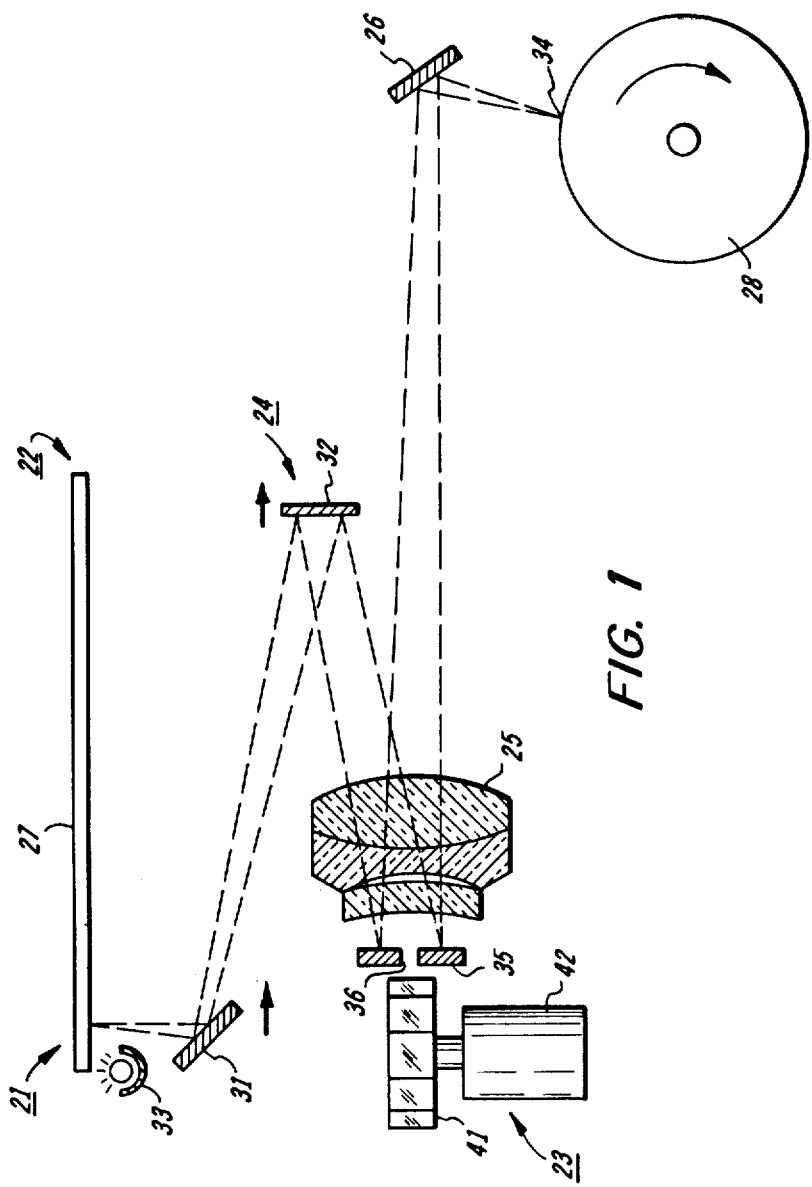
FIG. 1 is a schematic side or sagittal plane view of a multi-function document processor embodying the present invention wherein the processor is shown as being conditioned for photocopying and with certain parts removed for increased clarity.

Turning now to the drawings, and at this point especially to FIG. 1, there is a multi-function document processor 21 having a photocopying subsystem 22 for performing xerographic photocopying and a laser scanning subsystem 23 for performing raster input and output scanning. As will be seen, the subsystems 22 and 23 are structurally and functionally dependent on one another because of shared optical components. Nevertheless, it will be evident that the photocopying subsystem 22 is based on the Xerox 3400 copier and that the laser scanning subsystem 23 is based on the underfilled, double pass, symmetrical scanning system disclosed in the aforementioned U.S. Pat. No. b 4,274,203. Indeed, the relatively compact and economical character of the document processor 21 is directly attributable to a well conceived integration of those two state of the art systems.

In keeping with the standard configuration of the Xerox 3400 copier, the photocopying subsystem 22 comprises constant conjugate scan optics 24, a half lens 25, and a fixed mirror 26 in serial optical alignment between a transparent platen 27 and a photoconductively coated drum 28. The scan optics 24 include a full rate scan mirror 31, a half rate scan mirror 32, and a suitable light source 33 for photocopying. The light source 33 is mounted for movement with the full rate mirror 31, and the mirrors 26, 31 and 32 are elongated widthwise of the platen 27 to extend completely across a subject copy (not shown), such as an original document, having a scan length of up to, say, 14".

For photocopying, the subject to be copied is placed image side down on the platen 27 and is illuminated by light from the source 33. The drum 28 is rotated at a predetermined rate in the direction of the arrow, so that successive lines of the subject are sequentially imaged onto adjacent segments of the photoconductor as those segments pass through an exposure station 34. While the exposure station 34 is the only xerographic station that is specifically identified, it will be understood that the rotation of the drum 28 causes any given segment of the photoconductor to sequentially advance through a charging station, then through the exposure station 34, and subsequently through a development station, a transfer station, and a cleaning station before returning to the charging station.

If the subject to be copied is stationary on the platen 27, imaging is performed by synchronously advancing the full rate scan mirror 31 and the half rate scan mirror 32 lengthwise of the platen 27, as indicated by the arrows, at rates equal to the surface velocity of the drum 28 and one half that velocity, respectively. Alternatively, the scan mirrors 31 and 32 could be maintained in fixed positions while the subject is advanced lengthwise of the platen 27, although the Xerox 3400 copier does not normally include a suitable document feeder for operation in such a fixed optics scan mode. In any event, light reflected from any given scan line of the subject is intensity modulated in accordance with the image of that scan line and is reflected from the scan mirror 31 to the scan mirror 32 and then to the half lens 25. Light collected by the half lens 25 is reflected by a mirror 35 at the rear thereof and, therefore, passes back through the lens 25 to the fixed mirror 26 which, in turn, reflects it to the exposure station 34. The half lens 25 focuses the illuminated scan lines of the object (i.e., the subject to be copied) onto the photoconductively coated drum so that the photoconductor is exposed at the exposure station 34 to a well focused image of the object.

To accomodate laser input and output scanning, the rear mirror 35 of the half lens 25 is modified to have a small, optically transparent central aperture 36. The area of the aperture 36 need only be about 1/32" in the sagittal plane by ⅛" in the tangential plane, which means that its area is less than one percent of the total surface area of the rear mirror for the half lens in a conventional Xerox 3400 copier. Consequently, the presence of the aperture 36 does not materially reduce the optical efficiency of the photocopying subsystem 22 or otherwise cause the photocopying performance of the document processor 21 to fall below the high performance standards set by the Xerox 3400 copier. As will be appreciated, the light source 33 is energized for photocopying and de-energized for laser scanning.

Figure 2:
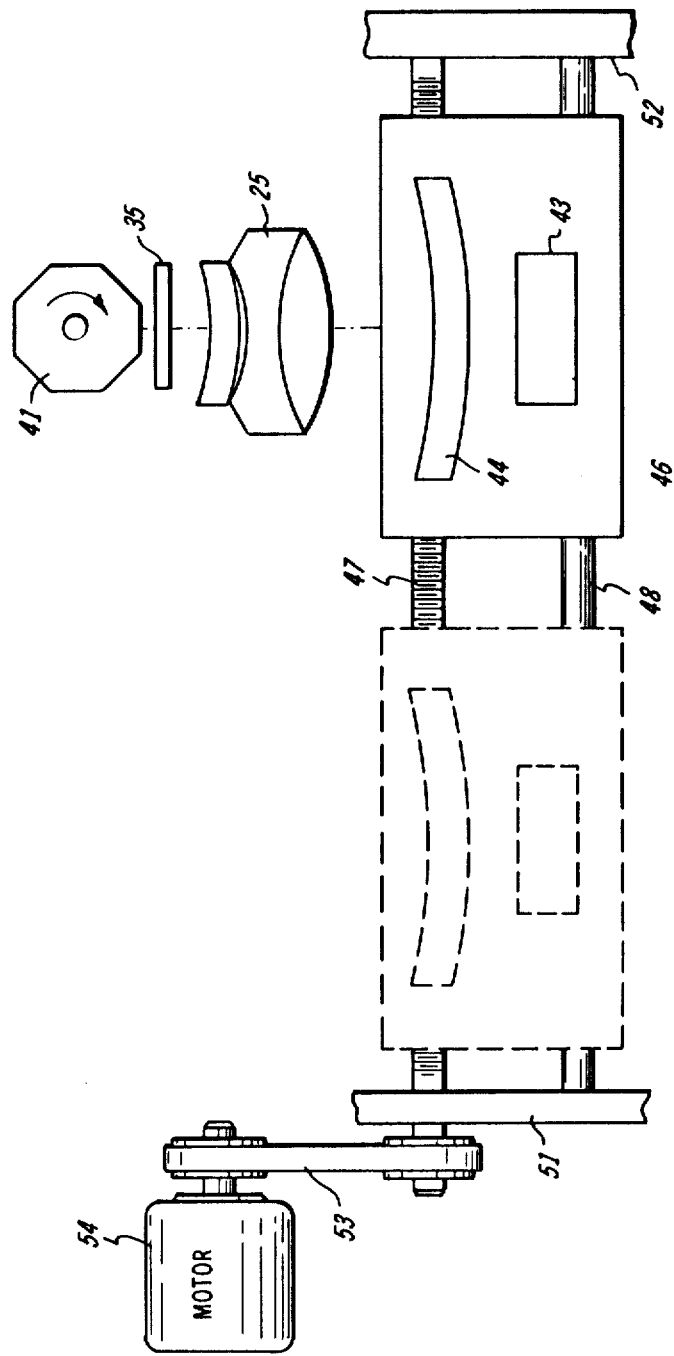
FIG. 2 is a simplified plan or tangential plane view of a carriage mechanism that is included in the document processor of FIG. 1 for moving a cylinder lens and a flip mirror mechanism into and out of optical alignment with a half lens for laser scanning and photocopying, respectively.

For laser input and output scanning, the laser scanning subsystem 23 comprises a multi-faceted, reflective polygon 41 which is positioned just slightly behind the rear mirror 35 of the half lens 25 in alignment with the aperture 36. A motor 42 rotates the polygon 41 at a predetermined angular velocity on an axis which is substantially perpendicular to the optical axis of the half lens 25. Moreover, as shown in FIG. 2, there is a flip mirror mechanism 43 and one or two cylindrical correction lenses 44 and 45 (FIGS. 4 and 5) which are moved into and out of optical alignment with the half lens 25 for laser scanning and photocopying respectively. As will be seen, when the flip mirror mechanism 43 and the correction lenses 44 and 45 are aligned with the half lens 25, the laser scanning subsystem 23 defines an underfilled, symmetrical, double pass laser input or output scanning system. Of course, the correction lenses 44 and 45 may be replaced by equivalent cylindrical correction mirrors if suitable provision is made to accomodate the increased folding of the optical paths which results from such a substitution. Furthermore, a single cylindrical correction lens or mirror will suffice if the incident and reflected beams for laser scanning are sagitally displaced from one another while being corrected by an angle of less than five degrees or so.

Referring to FIG. 2, the flip mirror mechanism 43 and the correction lenses 44 and 45 advantageously are mounted on a carriage 46 so that the document processor 21 may be selectively conditioned for photocopying or laser scanning relatively easily and quickly. As shown, the carriage 46 is threaded on a lead screw 47 and is supported for sliding movement on a guide rod 48. The lead screw 47 is journalled for rotation in opposed side frames 51 and 52 of the document processor 21 and is coupled through a belt and pulley drive train 53 to a reversible motor 54. Moreover, the guide rod 48 is also supported by the side frames 51 and 52 in parallel alignment with the lead screw 47 to guide the carriage 46 to its solid line, laser scanning position when the lead screw 47 is driven in, say, a clockwise direction and to its phantom line, photocopying position when the lead screw 47 is driven in the opposite or counterclockwise direction.

Figure 3:
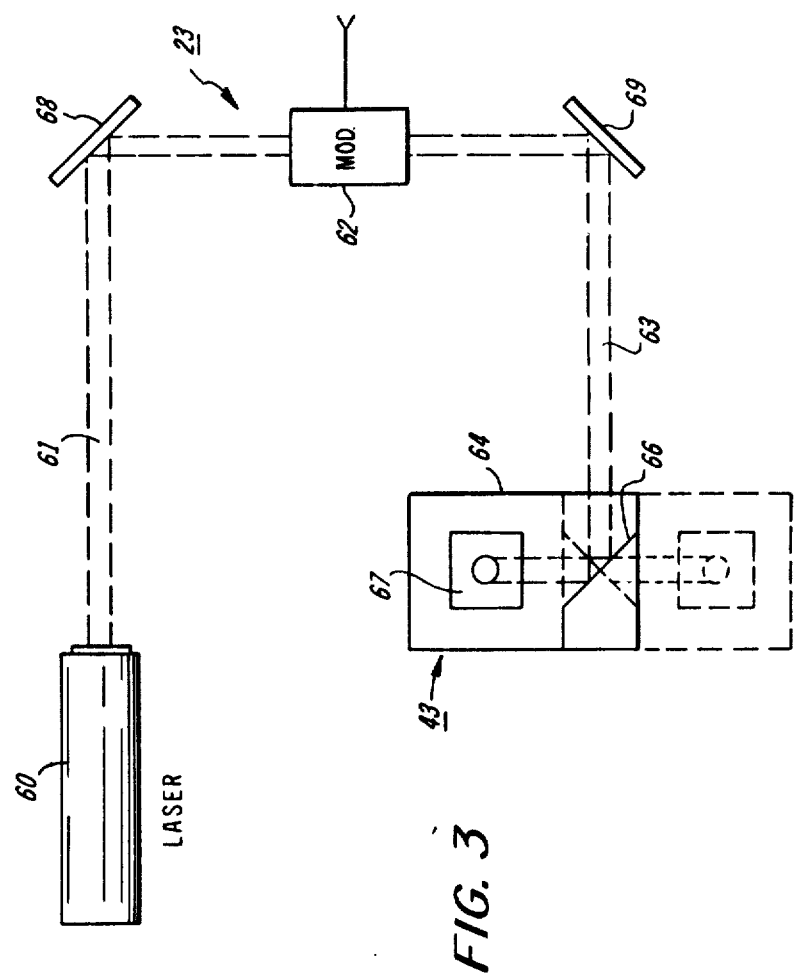
FIG. 3 is a schematic diagram of a portion of the laser scanning subsystem for the document processor to provide an enlarged view of the flip mirror mechanism as seen from the half lens looking back along the optical axis of the document processor.

Turning to FIG. 3, the laser scanning subsystem 23 includes a laser 60 for supplying a coherent light beam 61 and a Bragg modulator 62 for diffracting the light beam 61 so that the first order diffraction component thereof 63 may be modulated for raster output scanning or unmodulated for raster input scanning. During photocopying, the modulator 62 is de-energized so that no energy is coupled into the first order diffraction component 63. On the other hand, during laser scanning, the modulator 62 is driven by a serial data stream or by a d.c. control signal so that the first order diffraction component 63 of the laser beam 61 (the first order diffraction component 63 is sometimes referred to hereinafter simply as the diffracted light beam 63 since it is the only diffraction component that is actually utilized) is modulated for raster output scanning or unmodulated for raster input scanning. To achieve a symmetrical scan, the diffracted beam 63 is directed toward the correction lens 44 or 45 (1) in substantial alignment with the optical axis of the half lens 25 in the tangential plane and (2) at a converging angle relative to that axis in the sagittal plane for intersection therewith essentially on the active or illuminated facet of the polygon 41. The optical layout that is used to satisfy those conditions is not critical.

With that in mind, it will be understood that the flip mirror mechanism 43 suitably comprises a bracket 64 which is mounted for rotation (by means not shown) about an axis in the sagittal plane to support an axially centered, rotatable input mirror 66 and a radially displaced, fixed output mirror 67. For moving the flip mirror mechanism 43 back and forth between its solid line and phantom line positions, the bracket 64 and the input mirror 66 are rotated back and forth about such axis through 180 degrees and 90 degrees, respectively.

As shown, a corner mirror 68 reflects the laser beam 61 from the laser 60 to the modulator 62, and another corner mirror 69 reflects the diffracted beam 63 from the modulator 62 to the input mirror 66 of the flip mirror mechanism 43. The corner mirror 69 and the input mirror 66 are aligned orthogonally relative to the optical axis of the half lens 25. Thus, the output mirror 67 of the flip mirror mechanism 43 is tilted relative to its input mirror 66 to align the beam 63 with the optical axis of the half lens 25 in the tangential plane. Since the input mirror 66 is centered on the axis of rotation for the flip mirror mechanism 43, the alignment is maintained, regardless of whether the flip mirror mechanism 43 is in its upper solid line position for raster output scanning (FIG. 4) or its lower phantom line position for raster input scanning (FIG. 5). Moreover, the output mirror 67 is appropriately tilted in the sagittal plane relative to the optical axis of the half lens 25 so that the diffracted beam 63 intersects that axis substantially at the illuminated facet of the polygon 41 and reflects from the polygon 41 along a path which is sagittally diplaced from the output mirror 67 sufficiently to avoid any truncation of the reflected scanning beam.

Figure 4:
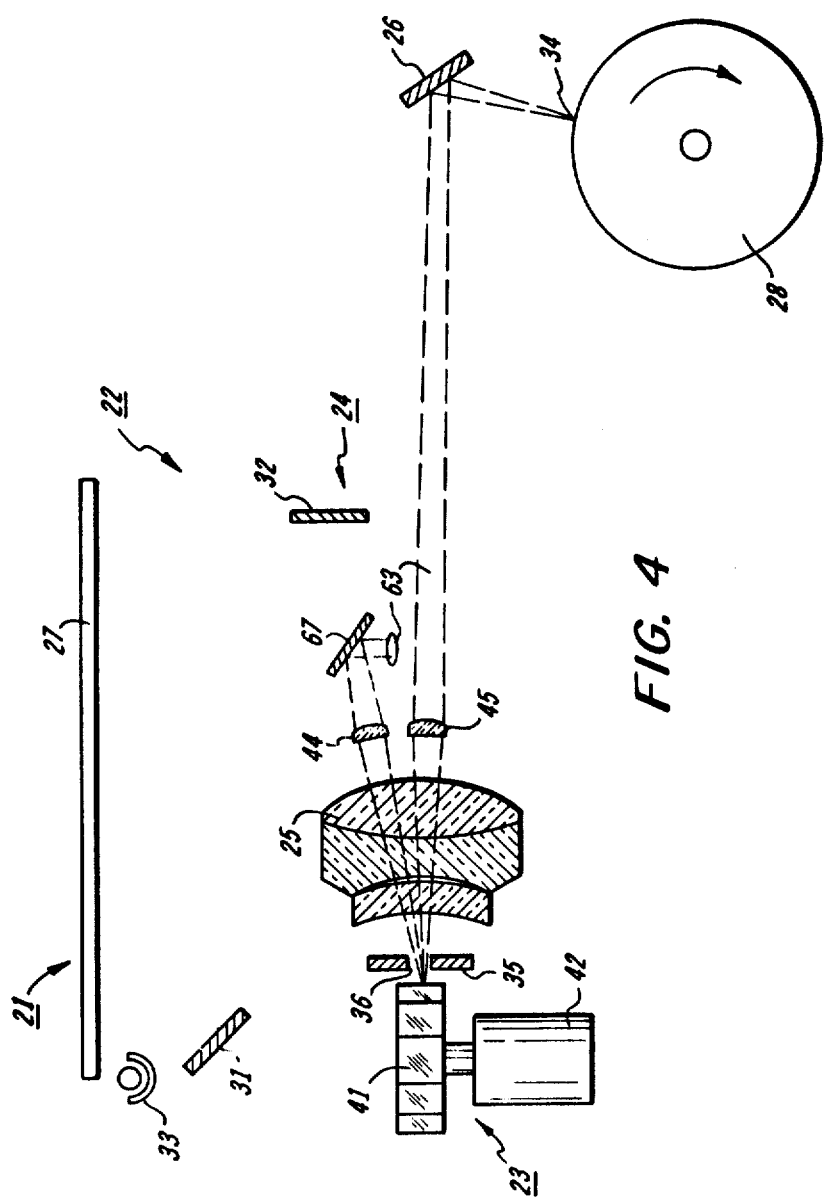
FIG. 4 is another diagrammatic side view of the document processor of FIG. 1 as conditioned to perform raster output scanning.
Figure 5:
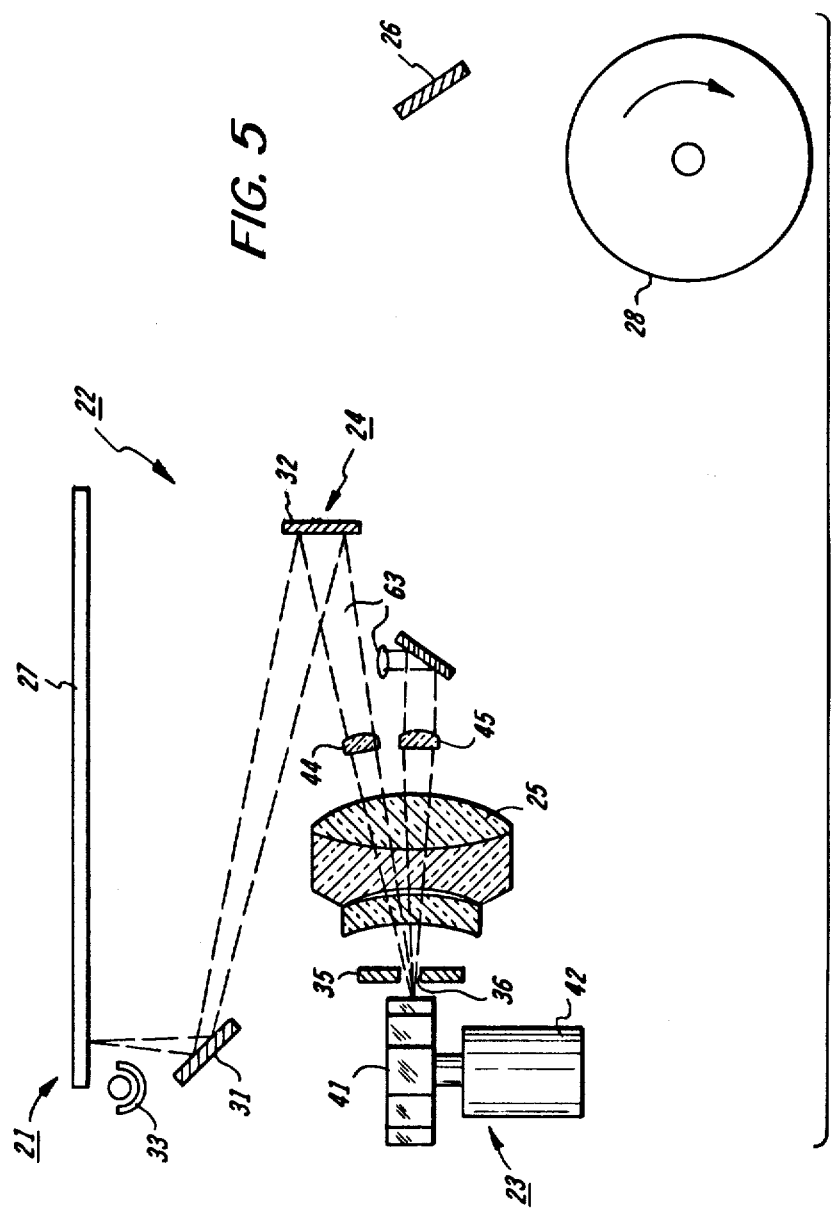
FIG. 5 is still another diagrammatic side view of the document processor of FIG. 1 as conditioned to perform raster input scanning.

As may be seen by referring to FIGS. 2, 4 and 5, in keeping with the symmetrical, underfilled, double pass laser scanning system disclosed in the aforementioned copending application, the cylindrical lenses 44 and 45 are centered on the optical axis of the half lens 25 in the tangential plane and are symmetrical about that axis in the sagittal plane. When laser input or output scanning are being performed, the cylindrical lenses 44 and 45 and the spherical lens 25 bring the diffracted laser beam 63 to a tangentially extending line-like focus on successive facets of the polygon 41 and restore it to a generally circular focus on the drum 28 (FIG. 4) or on the platen 27 (FIG. 5). To that end, the cylindrical lenses 44 and 45 are optically matched to one another and are selected to have substantial power in the sagittal plane and little, if any, power in the tangential plane. The tangential dimension of the laser beam 62 is limited so that it remains fully seated on a single facet of the polygon 41 while sweeping from one end to the other of a scan line, thereby causing the laser scanning subsystem 23 to operate in an underfilled mode for optimum efficiency. Preferably, provision (not shown) is made for ensuring that the laser beam 62 is substantially collimated in the tangential plane as it leaves the last surface of the lens 25 enroute to the polygon 41, so that the laser scanning subsystem 23 is essentially insensitive to any minor radial runout variations in the polygon 41.

As described in more detail in U.S. Pat. No. 4,274,703, the cylindrical lenses 44 and 45 provide the sagittal plane corrections that are required to compensate for any slight tilt or wobble of the polygon 41 or any slight coning errors in its individual facets. The lenses 44 and 45 also have a bending radius in the tangential plane that is selected to maintain the light beam 63 in focus over substantially the full width of the generally flat scan field that is defined by the drum 28 for laser output scanning or by the platen 27 for laser input scanning. Additionally, the half lens 25 and the cylindrical lenses 44 and 45 combine to provide a symmetrical, non-linear negative distortion which compensates for the tendency of the scan rate to vary as a function of the instantaneous field angle when scanning such a flat scan field.

The symmetry of the laser scanning subsystem 23 allows it to readily accomodate raster input and output scanning. As shown in FIG. 4, for raster output scanning, the modulated light beam 63 is focused on the polygon 41 by the cylindrical lens 44 and the half lens 25 and is refocused on the drum 28 by the half lens 25 and the cylindrical lens 45. The fixed mirror 26 intercepts the cyclically scanning beam 63 that is reflected from the polygon 41 and reflects it toward the exposure station 34 to expose the photoconductively coated drum 28 in an image configuration as the drum 28 advances through the exposure station 34 in a cross scan direction. On the other hand, as shown in FIG. 5, for raster input scanning, the unmodulated light beam 63 is focused on the polygon 41 by the cylindrical lens 45 and the half lens 25 and is refocused on the platen 27 by the half lens 25 and the cylindrical lens 44. The cyclically scanning light beam 63 that is reflected from the polygon 41 is intercepted by the scan mirror 32 and is reflected therefrom to the scan mirror 31 which, in turn reflects it to the platen 27 to scan successive lines of a subject copy (not shown). During raster input scanning, the scan is advanced in the cross scan or scan pitch direction as a result scanning action of the scan mirrors 31 and 32 if the subject copy is stationary or as a result of the cross scan motion of the subject copy if the scan mirrors 31 and 32 are stationary.

Figure 6:
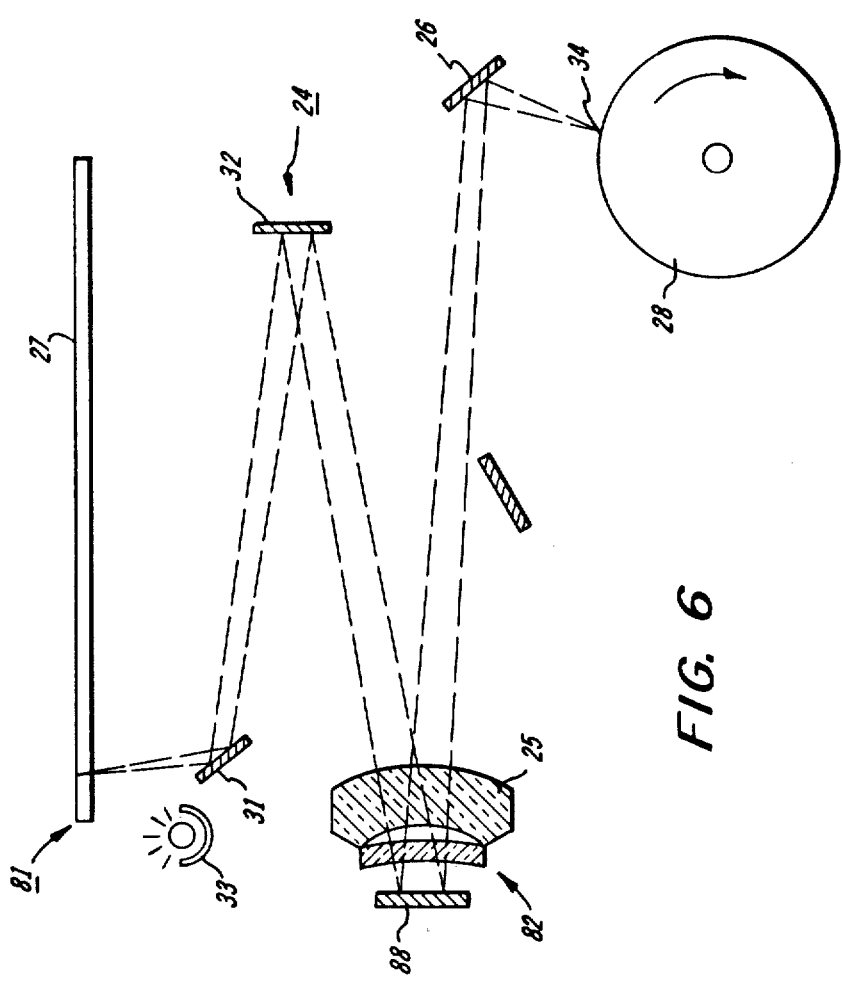
FIG. 6 is a diagrammatic side view of an alternative embodiment of this invention and shows the document processor in condition to perform photocopying and with certain parts removed for increased clarity.
Figure 7:
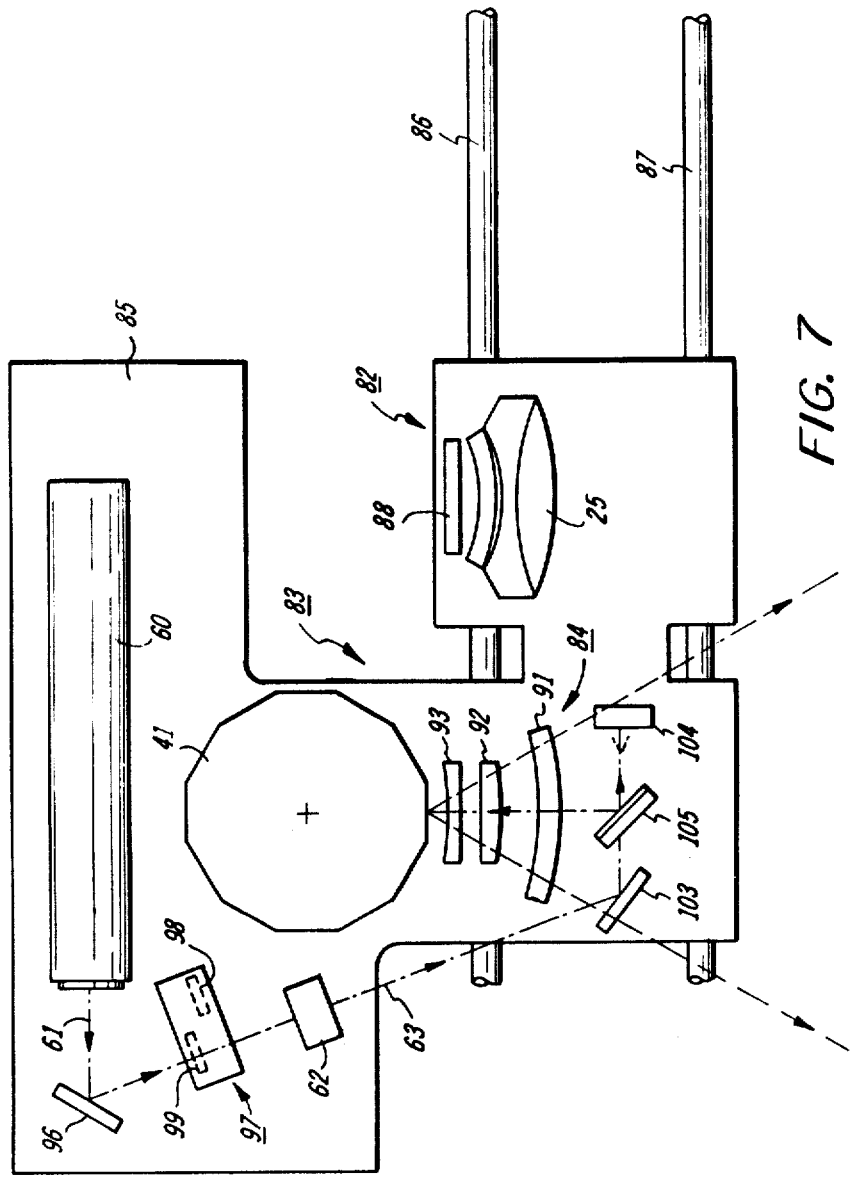
FIG. 7 is a simplified plan view of a carriage that is used in the document processor of FIG. 6 for selectively aligning a laser scanning subsystem or a half lens with the optical axis of the processor.

Turning now to FIGS. 6 and 7, there is another multifunction document processor 81 which is constructed in accordance with this invention to combine a photocopying subsystem 82 with a double pass, symmetrical, underfilled, rotating polygon laser scanning subsystem 83. The photocopying subsystem 82 is based on the Xerox 3107 copier, but is so similar to the previously described Xerox 3400 based photocopying subsystem 22 that like reference numerals have been used to identify like parts. Likewise, the laser scanning subsystem 83 can be readily correlated with the laser scanning subsystem 23 by using the same reference numerals to identify their corresponding parts.

Concentrating on the unique features of the document processor 81, it will be seen that the half lens 25 is used for photocopying but not for laser scanning. Separate imaging optics 84 are provided for laser scanning. More particularly, the Xerox 3107 copier includes a carriage 85 which is mounted for movement in the tangential plane on a pair of parallel guides 86 and 87. Thus, in accordance with this invention, the carriage 85 is modified to selectively move the half lens 25 or the imaging optics 84 into optical alignment with the platen 27 and the drum 28 for photocopying and laser scanning, respectively. As a result, the half lens 25 may be equipped with a conventional, aperture free rear mirror 88.

Figure 8:
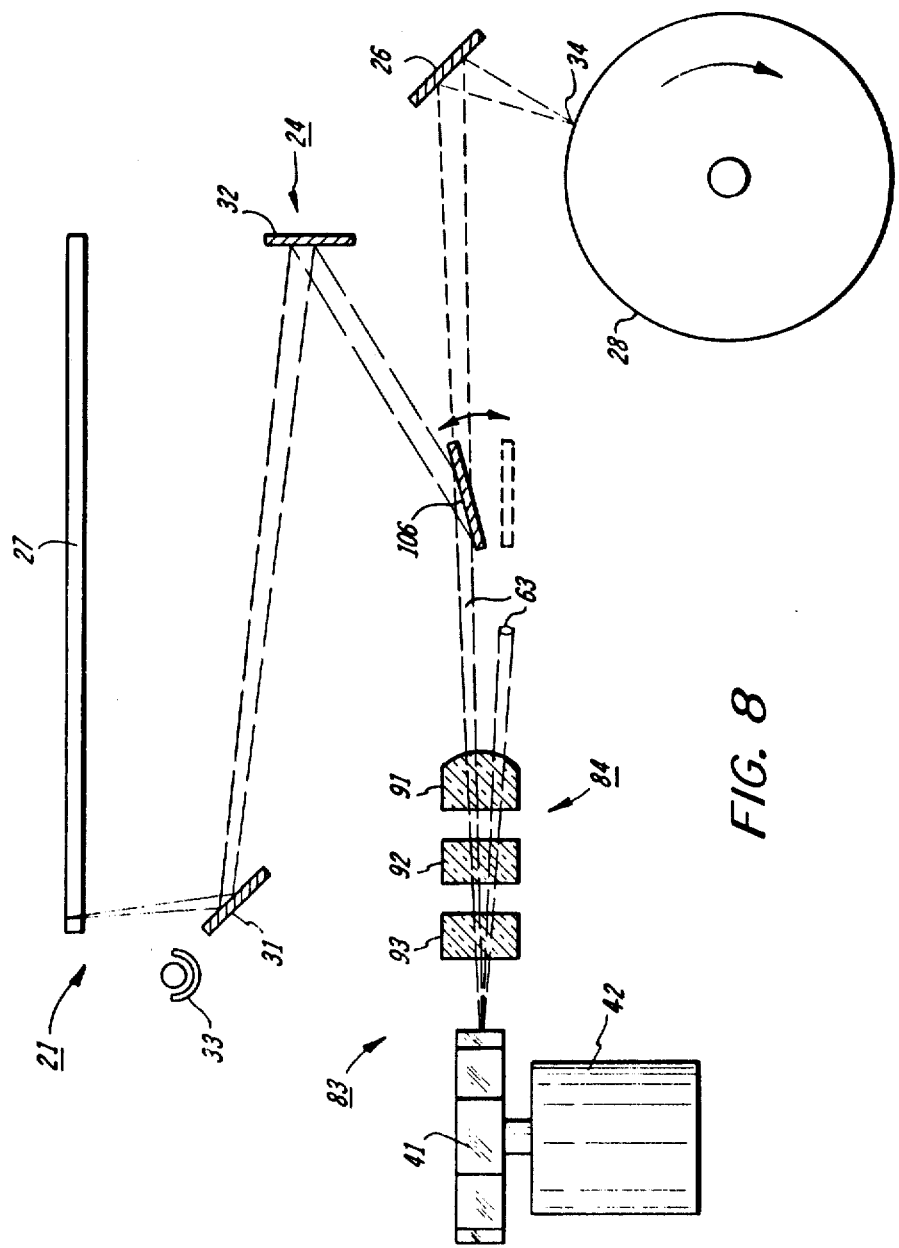
FIG. 8 is another diagrammatic side view of the document processor of FIG. 6 operating, as indicated by the solid lines, to perform raster input scanning or, as indicated by the phantom lines, to perform raster output scanning.

As best illustrated in FIG. 8, the imaging optics 84 for laser scanning comprise a single cylindrical correction lens 91 and a pair of crossed or mutually orthogonal cylindrical focussing lenses 92 and 93. As previously mentioned, a single cylindrical correction lens 91 or a single cylindrical correction mirror (not shown) will suffice if the incident and reflected beams for laser scanning are sagitally displaced from one another while being corrected by an angle of less than approximately five degrees. Furthermore, it will be recognized that the mutually orthogonal cylindrical lenses 92 and 93 are generally equivalent to, and could be replaced, by spherical lens elements (see FIGS. 4 and 5).

Returning for a moment to FIG. 7 for a more detailed review of the laser scanning subsystem 83, it will be seen that the output beam 61 of the laser 60 is reflected by a corner mirror 96 toward a lens turret 97 which selectively inserts a relatively low or a relatively high F# prefocussing lens 98 or 99 into the optical path for the light beam 61 for high or low resolution laser scanning, respectively. For example, for scanning at a resolution of roughly 400 lines/inch, a F100 prefocusing lens 98 is about right, while for scanning at a coarser resolution of 240 or so lines/inch, a F160 prefocusing lens 99 is adequate.

To cause the laser scanning subsystem 83 to operate in a symmetrical, double pass mode, the modulated or unmodulated diffracted light beam 63 appearing at the output of the modulator 62 is reflected by a corner mirror 103 to a downwardly tilted mirror 104 and then to an upwardly tilted input mirror 105. The input mirror 105 is centered in the tangential plane on the optical axis of the imaging optics 84, but is displaced therefrom and tilted with respect thereto in the sagittal plane so that the light beam 63 reflects from the mirror 105 to intersect the optical axis of the imaging optics 84 substantially at the illuminated facet of the polygon 41 and then reflects from the polygon 41 along a path which is sagitally displaced from and clear of the input mirror 105.

Alignment problems within the laser scanning subsystem 83 are minimized because the laser 60, lens turret 97, modulator 62, imaging optics 84, polygon 41, and all intermediate optics are mounted on the carriage 85.

Turning again to FIG. 8, to selectively condition the document processor 81 for raster input or output scanning, the flip mirror 106 of the Xerox 3107 copier is relocated so that it reflects the light beam 63 to the half rate scan mirror 32 for raster input scanning when it is in its upper solid line position and allows the light beam 63 to pass directly to the fixed mirror 26 for raster output scanning when it is in its lower phantom line position. It should be noted that the document processor 81 is well suited to a fixed optics raster input scan because the Xerox 3107 copier is equipped with a document feeder (not shown) for feeding documents lengthwise of the platen 27 (i.e., in a cross scan direction).

CONCLUSION

In view of the foregoing, it will now be understood that the present invention provides multi-function document processors which not only favorably compare in performance to dedicated, state of the art photocopiers and laser scanners, but which also have signicant cost and size advantages over the equivent collection of dedicated equipment. As will be appreciated, a multifunction document processor is an inherently efficient device because of its ability to accomodate a variety of document processing requirements.

What is claimed is:

1. In a multi-function document processor for selectively performing photocopying and raster scanning, said document processor including
 (a) a transparent platen for supporting a subject copy,
 (b) a selectively energizeable light source for illuminating said subject copy for photocopying,
 (c) another selectively energizeable light source for supplying a light beam for raster scanning, and
 (d) a photosensitive recording medium, and
 (e) imaging optics for photocopying and raster scanning, said imaging optics being optically aligned between said platen and said recording medium and having a predetermined optical axis;
the improvement comprising
 (i) a reflective, multi-faceted rotating polygon for cyclically scanning said light beam through a predetermined scan angle during raster scanning, and
 (ii) means aligned with the optical axis of said imaging optics in a tangential plane and displaced from said axis in a sagittal plane for applying said light beam to said polygon for raster scanning;
 (iii) said imaging optics being selected to focus said light beam on said polygon and to refocus said light beam on said platen or on said recording medium.

2. The improvement of claim 1 wherein said document processor further includes means for selectively directing said light beam from said polygon to said platen for raster input scanning and from said polygon to said recording medium for raster output scanning.

3. The improvement of claim 1 further including prefocusing means disposed between said other source and said imaging optics, said prefocusing means having a plurality of individually selectable prefocusing lenses each of which provides a different resolution for raster scanning.

4. The improvement of claim 1 wherein
 said light beam remains fully seated on a single facet of said polygon while being scanned through said scan angle.

5. The improvement of claim 4 wherein
 said imaging optics comprises a half lens having a rear mirror containing an optically transparent aperture, and at least one cylindrical correction element which is moved into and out of optical alignment with said half lens for raster scanning and photocopying, respectively,
 said polygon is positioned behind rear mirror in alignment with said aperture to receive and reflect said light beam through said aperture,
 whereby said half lens images said subject copy on said photoconductor for photocopying, and said half lens and said cylindrical correction element focus said light beam on said polygon and refocus said laser beam on said platen or on said recording medium for raster scanning.

6. The improvement of claim 5 wherein said cylindrical correction element has substantial power in said sagittal plane and relatively little power in said tangential plane, whereby said laser beam is brought to a tangentially extending, generally line-like focus on said polygon and to a more circular focus on said platen or on said recording medium, and said correction element compensates for any slight tilt, wobble and facet coning errors in said polygon.

7. The improvement of claim 6 wherein said imaging optics comprises an optically matched pair of cylindrical correction elements which are symmetrical about said optical axis in said sagittal plane for intercepting said light beam enroute to and from said polygon, respectively.

8. The improvement of claim 4 further including
 a laser for supplying a laser beam,
 a modulator for diffracting said laser beam to provide said light beam, and a carriage for supporting said imaging optics, said polygon, said laser, and said modulator; and wherein said imaging optics comprises first imaging means for photocopying, and second imaging means for raster scanning, said first and second imaging means are mounted in spaced apart relationship on said carriage to be selectively optically aligned between said platen and said recording medium for photocopying and raster scanning, respectively, and said laser, modulator, polygon, and said second imaging means are maintained in optical alignment on said carriage.

9. The improvement of claim 8 further including prefocusing means disposed between said other source and said imaging optics, said prefocusing means having a plurality of individually selectable prefocusing lenses to provide a choice of different resolutions for raster scanning.

10. The improvement of claim 8 further including a flip mirror mounted for movement into and out of optical alignment with said polygon for selectively reflecting said light beam to said platen for raster input scanning and passing said light beam to said recording medium for raster output scanning.

11. The improvement of claim 10 further including prefocusing means disposed between said other source and said imaging optics, said prefocusing means having a plurality of individually selectable prefocusing lenses to provide a choice of different resolutions for raster scanning.

* * * * *